(12) United States Patent
Geada et al.

(10) Patent No.: US 11,321,513 B1
(45) Date of Patent: May 3, 2022

(54) DVD ANALYSIS THAT ACCOUNTS FOR DELAYS

(71) Applicant: ANSYS, INC., Canonsburg, PA (US)

(72) Inventors: Joao Geada, Chelmsford, MA (US); Emrah Acar, Montvale, NJ (US); Altan Odabasi, Austin, TX (US); Scott Johnson, Pflugerville, TX (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 17/094,602

(22) Filed: Nov. 10, 2020

(51) Int. Cl.
*G06F 30/3312* (2020.01)
*G06F 119/12* (2020.01)
*G06F 119/06* (2020.01)

(52) U.S. Cl.
CPC ...... *G06F 30/3312* (2020.01); *G06F 2119/06* (2020.01); *G06F 2119/12* (2020.01)

(58) Field of Classification Search
USPC ......................................................... 716/108
See application file for complete search history.

(56) References Cited

U.S. PATENT DOCUMENTS

| 2013/0080987 | A1* | 3/2013 | Kipper | G06F 30/34 716/113 |
| 2017/0061067 | A1* | 3/2017 | Gregerson | G06F 30/394 |
| 2017/0220502 | A1* | 8/2017 | Kessler | G06F 13/364 |

* cited by examiner

*Primary Examiner* — Mohammed Alam
(74) *Attorney, Agent, or Firm* — Womble Bond Dickinson (US) LLP

(57) ABSTRACT

Techniques for computer aided design and engineering of integrated circuits can use group identifiers of correlated signals and time delay values when using vectorless dynamic voltage drop (DVD) simulations and when using other types of simulations or analyses of a circuit design. A method in one embodiment can include the operations of: receiving a design representing an electrical circuit that includes a plurality of pins, the plurality of pins including one or more input nodes or one or more output nodes in the electrical circuit; identifying, in the design, one or more groups of pins that are correlated such that, within each identified group, all of the pins in the identified groups switch between voltage states in a correlated way; assigning, for each pin in each identified group, an identifier for the identified group and a time delay value based on the pin's delay from an initial point in the identified group's logic chain to the pin. The group identifier and the time delay at each pin can limit the switching activities in the DVD simulations to reduce pessimistic results from the simulations. Other methods are described, and data processing systems and machine readable media that cause such systems to perform these methods are also described.

20 Claims, 10 Drawing Sheets

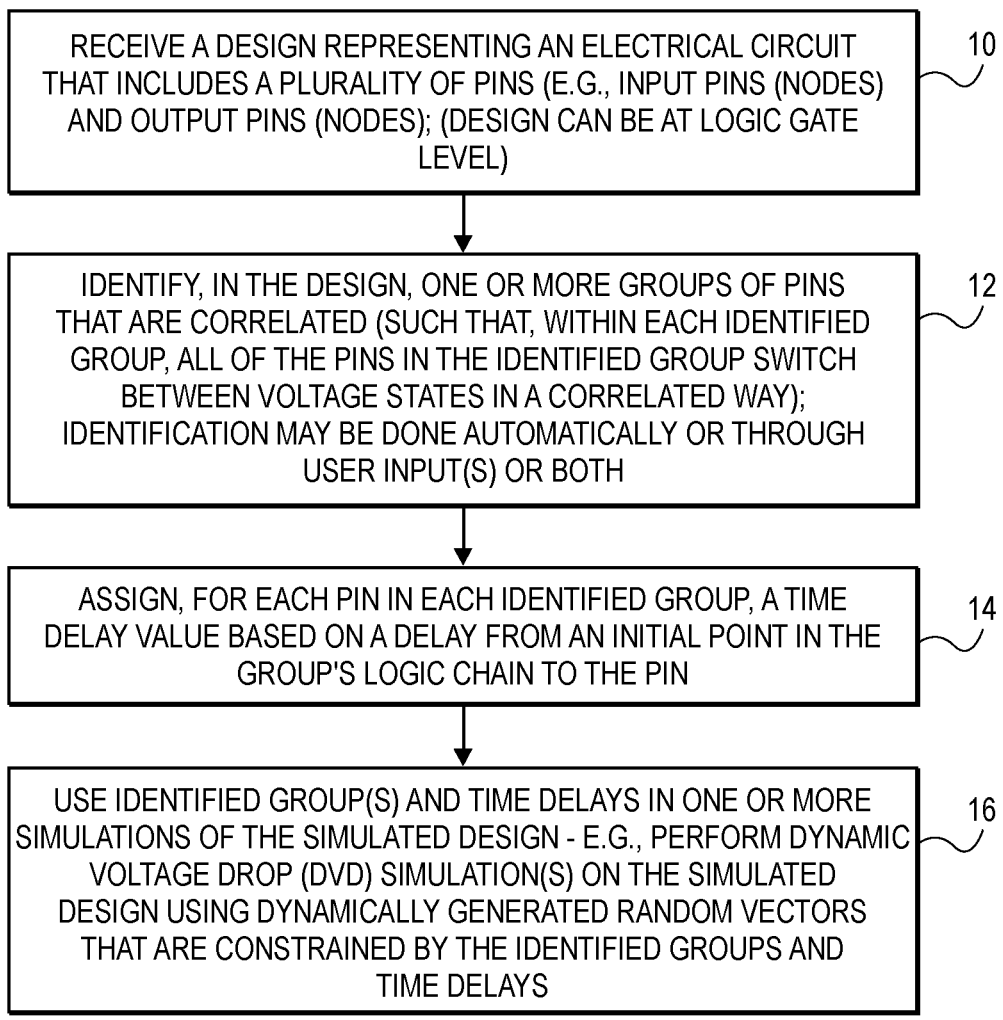

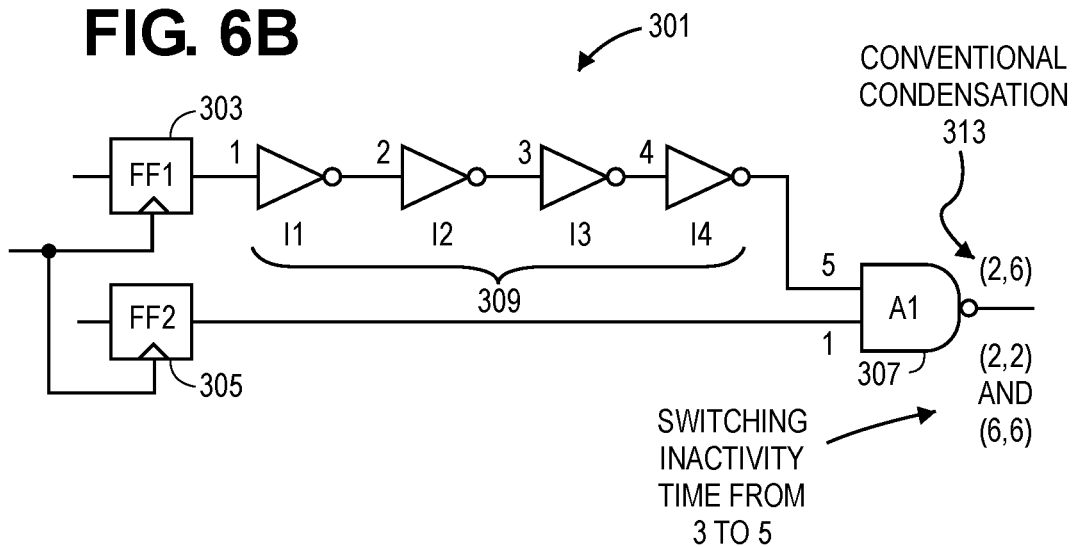
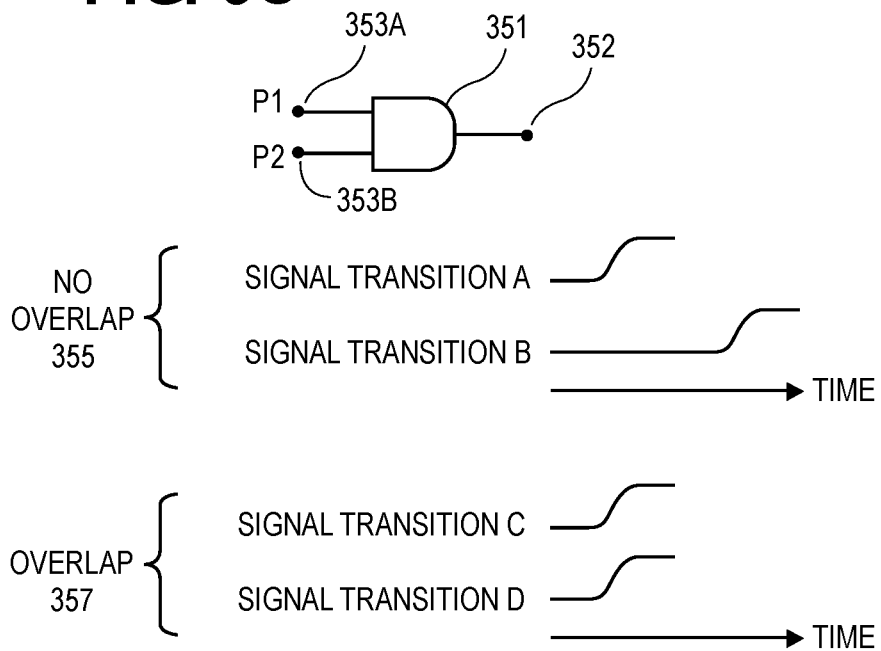

DVD ANALYSIS THAT ACCOUNTS FOR DELAYS

BACKGROUND

This disclosure relates to systems and methods for designing electrical circuits such as integrated circuits. In particular, the disclosure relates to computer aided design and computer aided engineering which can use simulations, such as dynamic voltage drop simulations, of a design to test how well the design will work.

Dynamic voltage drop analysis is often done to simulate how a power grid or power distribution network in an integrated circuit will perform when data signals switch or toggle between voltage states, such as from high to low states, etc. Often, this switching can cause circuits to consume more power than when the circuit is idle (and therefore there is little switching). This increased power consumption can cause the power grid to deliver less than desired levels of voltage at one or more nodes or pins in the circuit, and this lowered level of voltage can affect the operation of logic circuits to the extent that the logic circuits may not operate correctly or as desired. Thus, circuit designers often use simulation software to perform dynamic voltage drop analysis before they finish the design of an electrical circuit. Dynamic voltage drop analysis typically involves simulating the repeated change over time of various data signals so that over time different data signals are repeatedly toggled to different voltage states to simulate normal operation of the circuit (in which it is expected that the various data signals will change over time due to the normal operation of the circuit). When performing dynamic voltage drop analysis, signals that are to be toggled are identified in a vector that can either be user provided or automatically constructed through a random approach which is often referred to as a vectorless approach. A purely random selection of signals is used in this vectorless approach which can be fast and easy and provide a reasonable representation for full system power. However, purely random selection can lead to toggle selections that would be impossible to occur in the actual design, such as by choosing to signals to toggle in the same direction that are connected by an inversion or that are mutually exclusive. In this situation, randomly selected vectors are pessimistic in that they cause higher dynamic voltage drop versus than what would be observed in the real physical design.

SUMMARY OF THE DESCRIPTION

One aspect of this disclosure involves using a correlated group of signals and time delays within the correlated group to constrain simulations, such as dynamic voltage drop simulations of an electrical design. A method according to this aspect can include the following operations: receiving a design representing an electrical circuit that includes a plurality of pins, the plurality of pins including one or more input nodes or one or more output nodes in the electrical circuit; identifying, in the design, one or more groups of pins that are correlated such that, within each identified group, all of the pins in each identified group switch between voltage states in a correlated way; and assigning, for each pin in each identified group, an identifier for the identified group and a time delay value based on the pin's delay from an initial point in the identified group's logic chain to the pin. In one embodiment, the initial point is an input pin of the logic chain, and the pin's delay is based on design data about logic instances from the initial point to the pin. In one embodiment, the design data specifies data from which time delays in signal propagation can be estimated. In one embodiment, the method can further include the operations of: storing data for each pin in each identified group, the stored data comprising the identifier for the identified group and the time delay of the pin; and performing one or more simulations of the design using the stored data. In one embodiment, the one or more simulations can comprise: (1) one or more dynamic voltage drop simulations or (2) one or more timing/voltage analysis simulations or (3) one or more dynamic voltage drop simulations and one or more timing/voltage analysis simulations. In one embodiment, the method can further include the operations of: determining, for each pin in each identified group, whether a switching inactivity time exists in a set of signal transition times at the pin; and storing data representing the switching inactivity time for use in one or more simulations. The stored data can be switching activity times for each pin in a set of pins, where these switching activity times are the inverse of the switching inactivity times because the switching inactivity times are the gaps in time between the switching activity times, and thus the switching activity times represent the switching inactivity times.

Another aspect of this disclosure relates to the use of refined timing windows that can be used in simulations to more accurately reflect switching times in instances in the design; these refined timing windows can constrain switching activity when random dynamic voltage drop vectors are used in simulations. A method according to this aspect can include the following operations: receiving a design representing an electrical circuit that includes a plurality of pins, the plurality of pins including one or more input nodes or one or more output nodes in the electrical circuit; determining a set of signal transition times at each pin in the plurality of pins; determining, based on the set of signal transition times, whether a switching inactivity time exists in the set of signal transition times at each pin; and storing data representing the one or more switching inactivity times at each pin for use in dynamic voltage drop simulations. In one embodiment, the switching inactivity exists when successive signal transitions at each pin do not overlap in time. In one embodiment, the method can further include the operation of: determining gaps in time during which switching inactivity exists for each pin, and these determined gaps can constrain simulated switching activity in one or more dynamic voltage drop (DVD) simulations of the design. In one embodiment, when successive signal transitions do overlap, the successive transitions are condensed into a merged transition that covers a combined time period of both transitions in the successive transitions, and a conventional condensing algorithm can be used in this case. In one embodiment, the one or more DVD simulations use random dynamic voltage drop vectors that are constrained, by the determined gaps, to prevent switching during determined gaps for each pin; these random DVD vectors cause switching activity in the DVD simulations. In one embodiment, the method can further include the operations of: identifying, in the design, one or more groups of pins that are correlated such that, within each identified group, all of the pins in the identified groups switch between voltage states in a correlated way; assigning, for each pin in each identified group, an identifier for the identified group and a time delay value based on the pin's delay from an initial point in the identified group's logic chain to the pin. These identified groups and time delays can, in one embodiment, further constrain use of the random DVD vectors to limit switching activity in the one or more simulations.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 1 shows a flowchart that illustrates a method according to one embodiment described herein.

FIG. 6B shows an example of how an embodiment can determine switching inactivity times for a circuit.

FIG. 6C shows an example of how overlaps in time of signal transitions at a pin can be determined.

DETAILED DESCRIPTION

Figure 2A:
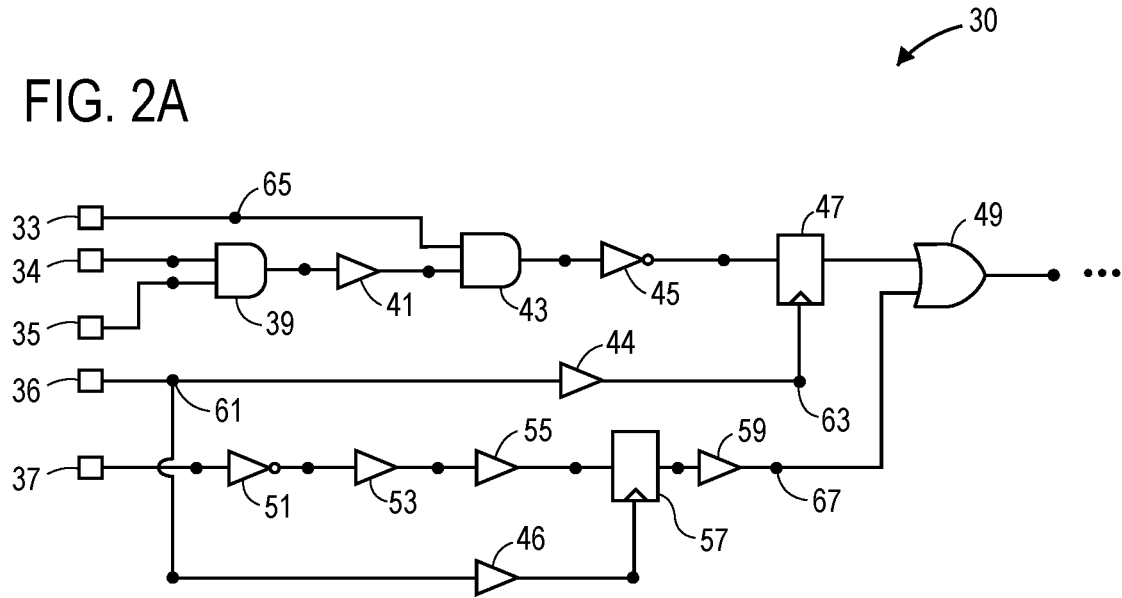
FIG. 2A shows a circuit design that can be analyzed in a DVD simulation according to one embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

This disclosure is related to a prior filed US patent application that describes detecting correlated groups of signals and using the detected groups to constrain toggling of signals in vectorless DVD simulations; that prior filed US patent application is U.S. patent application Ser. No. 16/723,894, filed Dec. 20, 2019 by Applicant ANSYS, Inc. of Canonsburg, Pa. and that prior filed US patent application is hereby incorporated herein by reference.

One aspect of the embodiments described herein can use the identification of groups of pins or signals in an electrical circuit and time delays estimated relative to those pins to constrain test vectors used to decide which signals to toggle or not toggle in a simulation such as a dynamic voltage drop simulation that can be performed in simulation software that operates on a simulated design of an electrical circuit. In one embodiment, the toggling of pins involves the switching of voltage states such as switching from high to low or vice versa for data signals in the simulated electrical circuit. For example, if a pin in the design was simulated to be at a high voltage state (e.g., VDD) and it was decided to toggle the pin, the pin would switch in the simulation from the high voltage state to the low voltage state (e.g., ground). FIG. 1 shows an example of a method in one embodiment according to this aspect. In operation 10, the simulation software can receive a design that represents an electrical circuit that includes a plurality of pins. The plurality of pins can include input pins as well as output pins, and the design of the electrical circuit can be represented at a logic gate level (e.g., see the circuit 30 in FIG. 2A) in one embodiment. In one embodiment, the input pins can correspond to nodes within electrical circuit and the output pins can also correspond to nodes in the circuit. Pins or nodes are used in this description to mean a point at which a "net" and a cell connect. In other words, the pin or node is a point object that represents the point at which the net and a cell connect, and thus these points normally include inputs to and outputs from cells. A net is a collection of conductors and other elements used to make connections between cells. A net can include resistors and capacitors. A cell is a logic element or instance that often includes active components, such as transistors; cells include: buffers, inverters, logic gates such as AND, OR, NAND, NOR, etc. gates and other logic elements used in integrated circuits. Thus, the net is the interconnect between cells, and the cells provide logic functions to give the circuit its desired functionality. A pin is associated with the group identifier and time delay as described below, and the time delay is due to delays caused by the net leading to the pin and delays caused by the cells along the path to the pin. In one embodiment, those skilled in the art will recognize that certain input pins can be considered to be primary input pins that provide inputs to all other pins in a circuit. In one embodiment, the primary pins can be the bonding pads on the integrated circuit at the periphery of the integrated circuit and primary pins can also include pins within the design that are not bonding pads.

In operation 12, the method can identify, in the design, one or more groups of pins that are correlated such that, within each identified group, all of the pins in the identified group switch between voltage states in a correlated way. In one embodiment, the identification may be done automatically without user input while in another embodiment, the identification may be performed through one or more user inputs provided through a user interface in the simulation software. In another embodiment, the identification may be performed both automatically and also through user input through a user interface. Further information about the automatic identification of such groups will be provided further below.

The identification through user inputs can include, for example, allowing the user to specify a set of pins (in one or more nets) as being a correlated group or allowing the user to identify a set of pins (in one or more nets) as having been encoded using certain encoding schemes which provide correlated pins or signals, such as N-hot encoded bus schemes or N-cold encoded bus schemes. In one embodiment, automatic identification can be restricted to features in a circuit design that are implicit from the circuit's topology and function and all other constraints are to be provided by the user (e.g. circuit designer). In one embodiment, once buses are discovered (either automatically or by user provided information), a worst case assumption can be used that all bits in a bus are correlated (this assumption can be considered conservative and hence safe). User provided constraints can be provided to (1) indicate that the design operates under a tighter activity constraint, which will limit the amount of activity assumed (and thus lower implied maximum power) and (2) remove the false failure (dynamic voltage drop or timing) caused by the safe, but incorrect, assumption of all bits switch together.

Once the groups of correlated pins are determined or identified they can be used in operation 14 in FIG. 1 to determine time delay values. In operation 14, the data processing system can automatically determine, based on data about the design (e.g., cell library data), time delay values at each pin (as a result of delays through connections and cells) in each identified group; each time delay value can be derived or calculated from an initial value (such as zero) at an initial point in the group's logic chain and the intervening time delays estimated for each intervening instance in the chain. Examples of how these time delay values can be derived are shown in FIGS. 2B and 2C. FIG. 2C shows a group of buffers that have correlated signals; these may be, for example, buffers in a clock tree. When buffer 81 switches, all other buffers in the chain will switch at the time dictated by the time delays introduced by each buffer. The buffers 81, 82, 83, 84, 85 and 86 have been identified and labelled as correlated group 1, and each of the pins within the logic chain shown in FIG. 2C have been labelled with the group identifier ("1") and a time delay value (at the pin as a result of delays through connections and cells) derived from the data about the buffers (e.g., cell library data that specifies time delays in an arc an instance or cell which in this case is a buffer); in this example, each buffer is identical and introduces a delay of 1. It will be appreciated that actual time delay values can be in floating point values measures in nanoseconds or other time units. Due to these physical delays in the actual circuit, the switching event propagates through the chain as follows: the first instance in the chain (buffer 81) will switch and then buffers 82, 85 and 86 will switch and then buffer 83 will switch and finally buffer 84 will switch. These time delay values can be taken into account within the correlated group during one or more DVD simulations in order to constrain toggling within the group during the simulations.

In operation 16, the identified groups and their internal time delay values can be used in one or more simulations of the simulated design. For example, simulation software can perform dynamic voltage drop simulations on the simulated design using dynamically generated random vectors that are constrained by the identified groups and time delay values. For those pins which are not in any identified groups, the toggling can directly use conventional random values in the random vectors and signals on such pins will toggle based on the random values in the vectors. On the other hand, pins within each identified group will toggle (or not toggle) as a group at the appropriate time based on the time delay values, rather than separately for each pin within the group, based upon the correlation or relationship between each of the pins in each of the identified groups of pins. Moreover, their toggling within a group will be constrained by the time delay values to allow toggling when appropriate based on the time delays. For example, pins in a clock tree will toggle as a group, at the appropriate time based on the time delay values, rather than randomly; thus when an input pin in a clock tree toggles, then all pins in the net of the clock tree will toggle in the same direction at the appropriate time based on the time delay values and if the input pin does not toggle, then no pin in the clock tree will toggle. Similarly, in a series of buffers coupled in series, if the input pin to the series toggles then all pins in the serial connection will toggle at the appropriate time based on the time delay values, and if the input pin to the series does not toggle then all pins in the serial connection will not toggle. The control of toggling based on the identified groups will reduce the pessimism that is often found in standard random vectors used for DVD simulations. This pessimism often results in unnecessary modifications to the power grid or power distribution network on an integrated circuit, and these unnecessary modifications can be eliminated by the use of one or more embodiments described herein. The embodiments described herein can also be used to perform timing and voltage analysis using the constraints imposed by the identified groups.

Figure 2B:
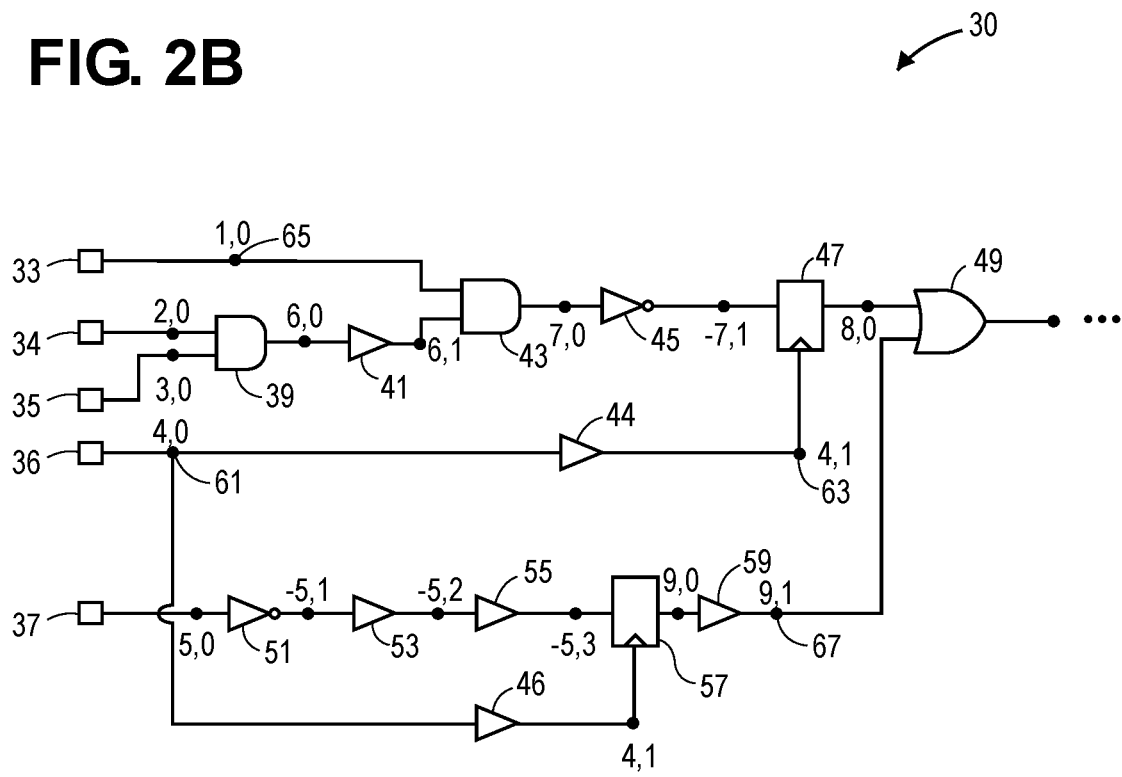
FIG. 2B shows the circuit design of FIG. 2A after a plurality of groups have been identified as having correlated pins according to one embodiment.
Figure 2C:
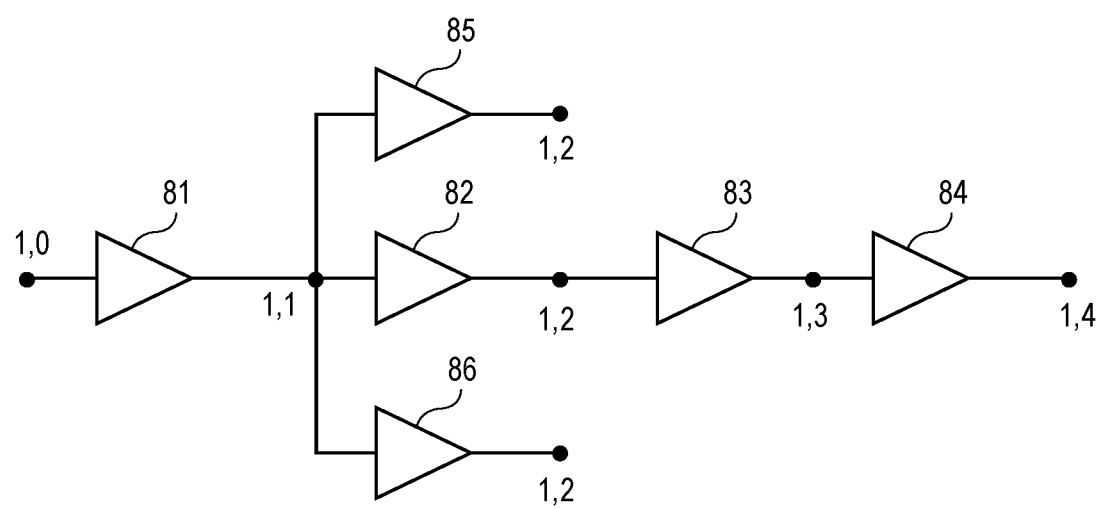
FIG. 2C shows an example of a circuit that is a correlated group with time delay values stored with the group identifier.

FIG. 2A shows an example of a circuit 30 which will be used to describe the construction of groups that are identified as having correlated pins. The circuit 30 includes a power grid or power distribution network which includes one or more power lines that supply power to cells in the circuit 30. It will be appreciated that a typical integrated circuit includes many such power lines dispersed in a network or grid to distribute power to the logic circuits or logic elements (which can be referred to as cells) such as AND gates, OR gates, NAND gates, NOR gates, inverters, D flip-flops, and other known logic circuits or logic elements used in integrated circuits. It will be appreciated that the power lines are connected to individual components (e.g., transistors) within each of the logic circuits to provide power to those individual components, and these connections are not shown in order to provide an uncluttered view of the circuit 30. The circuit 30 includes input pins 33, 34, 35, 36, and 37. Each of these input pins feed inputs, through connections ("nets") and cells, to other pins in the circuit including for example pins 63 and pin 67 as well as pins 61 and 65. Input pins 34 and 35 provide inputs to the AND gate 39, and input pin 37 serves as an input to the inverter 51. Pin 65 is connected to the input pin 33, and pin 65 is an input to the AND gate 43. The circuit 30 also includes D flip-flops 47 and 57. Each of these D flip-flops has a clock input coupled, through circuit connections such as a net and a cell, to the input pin 36. It should be apparent that primary input pin 36 feeds a clock tree which provides the clock signals to each of the D flip-flops 47 and 57. The circuit 30 also includes inverters 45 and 51, and the circuit 30 also includes buffers 41, 44, 46, 53, 55 and 59. The output from the D flip-flop 47 and the output from the buffer 59 are provided as inputs to the OR gate 49 which provides the final output from circuit 30, although it will be appreciated that the final output from circuit 30 may be provided to other circuits in the integrated circuit which includes circuit 30.

Figure 3:
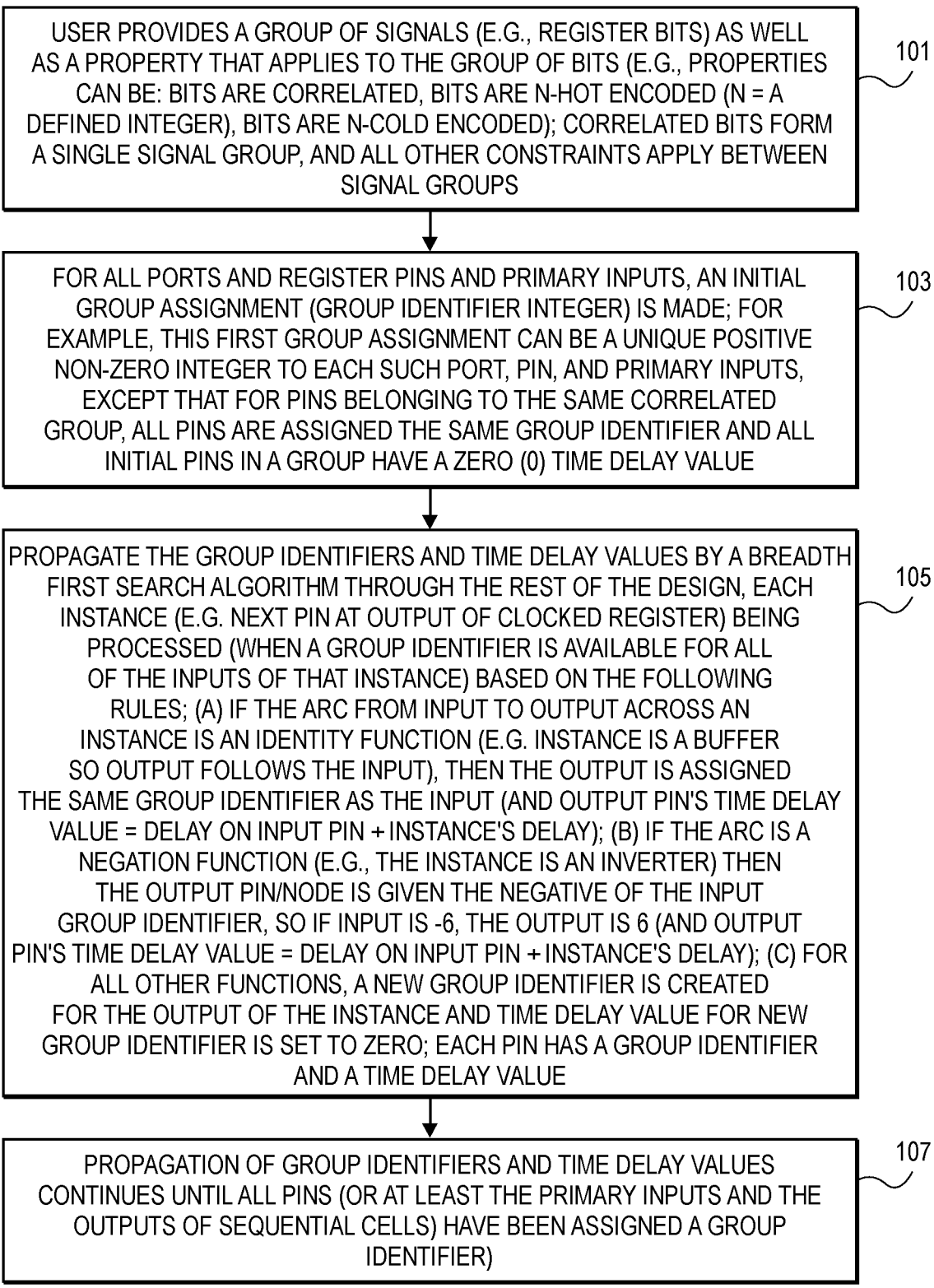
FIG. 3 is a flowchart which illustrates a method of constructing groups, having correlated signals or pins, with time delay values according to one embodiment.

A more detailed method for constructing identified groups according to one embodiment will now be described while referring to FIG. 3. The method shown in FIG. 3 can represent an implementation of operation 12 shown in FIG. 1. In operation 101 in FIG. 3, a user can provide or identify a group of signals, such as register bits, and can specify a property that applies to the group. For example, the user can specify that the group is correlated in their switching properties (e.g., they switch voltage states in a correlated way during normal operation and do not independently switch voltage states). As another example, the user can specify the group is correlated by an encoding scheme such as an n-hot encoded scheme or an n-cold encoded scheme. Once these groups are identified by the user (e.g., through a user interface), they can be treated as a correlated group of pins and use the methods described relative to FIG. 1 or FIG. 4 (to be described below). While operation 101 emphasizes user input to identify correlated groups of pins, the embodiments described herein can also perform automatic group identification as described further below (e.g., in operation 105 and in the example shown in FIG. 2B). In one embodiment, the method shown in FIG. 3 can use both user inputs to identify correlated groups of pins and also use automatic identification of correlated groups; in another embodiment, the method shown in FIG. 3 may use user inputs without using automatic identification or may use automatic identification without using user inputs to identify correlated groups.

In operation 103, an initial group assignment can be made for a selected group of pins such as all ports and primary inputs; in one embodiment, the selected group of pins is less than all of the pins in the design. In one embodiment, the initial group assignment can be performed by assigning a unique positive non-zero integer to each primary input. A primary input in this embodiment can be a bonding pad which is an external input pin or output pin to allow the electrical circuit in the design to be connected to components outside of the integrated circuit or can be input pins deep within the design. In the example shown in FIGS. 2A and 2B, the primary input pins can be considered to be pins 33, 34, 35, 36, and 37. Each of these pins can be assigned a group identifier as part of operation 103 and the initial group number can be a unique positive non-zero integer. In the example shown in 2B, the input pin 33 is assigned group number 1 as shown by pin 65. The input pin 34 is assigned the group identifier number 2, and the input pin 35 is assigned the group identifier number 3. Input pin 36 is assigned group identifier 4, and input pin 37 is assigned group identifier 5. In addition to assigning initial group identifiers, initial time delay values are also assigned with the initial group identifiers; in the example shown in FIG. 2B, each of the initial group identifier numbers 1, 2, 3, 4, and 5 have been assigned an initial time delay value of zero. For example, pin 61 is assigned a group identifier number of 4 and an initial time delay value of zero (0). The initial time delay value may be other values instead of zero, but zero represents time zero at the beginning of the group in the illustrated embodiment. After the initial group assignments and initial time delay values are completed for at least the primary input pins, then the group identifiers and time delay values can be propagated through the design in operation 105.

Figure 4:
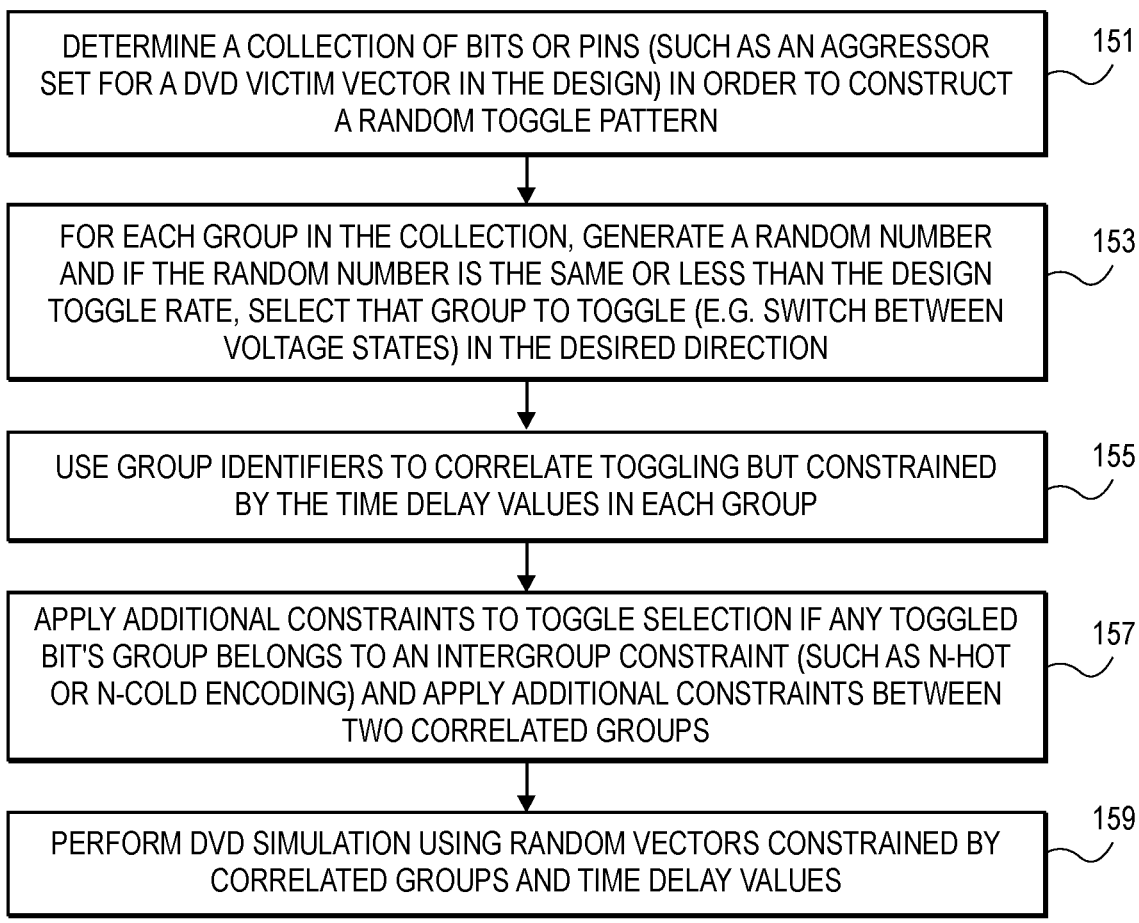
FIG. 4 shows a flowchart that shows a method for using the correlated groups and time delay values to provide an analysis of a circuit design, such as a dynamic voltage drop analysis or simulation.

In operation 105, the propagation of the group identifiers and time delay values can be performed by a breadth first search algorithm through the rest of the design, wherein each instance, such as the next logic element in a path, is processed based on a set of rules. The breadth first search algorithm can be one of the breadth first search algorithms that are known in the art and can be used to propagate the group identifiers and time delay values by the use of the following rules: (a) if the arc across an instance (e.g., a logic gate) from the input of the instance to the output pin of the instance is an identity function then the output is assigned the same group identifier as the input and the output pin's time delay is calculated as the sum of the time delay value at the input pin plus the delay of the instance; (b) if the arc is a negation function, such as when the instance is an inverter, then the output pin at the instance is given the negative of the input group's identifier so for example if the input is −6 then the output is 6 and the output pin's time delay is calculated as the sum of the time delay value at the input pin plus the delay of the instance; (c) for all other functions, a new group identifier is created for the output of the instance and an initial time delay value of zero is assigned to the output of the instance. These three rules can be seen in the propagation of group identifiers which is shown in FIG. 2B. For example, the signal at pin 61 has been assigned a group identifier of 4, and this group identifier is propagated through two instances shown as buffers 44 and 46, where these instances provide the identity function so that pin 63 is assigned group identifier 4 and a time delay of 1 and the other pins along the path of that signal are also assigned a group identifier of 4 and their calculated time delay value. The propagation of group identifier 5 begins at the inverter 51 which provides a negation function and thus the negative of that group number is propagated through the rest of the series connection through the buffers 53 and 55. At the D flip-flop 57, the group number normally changes (due to the clock controlling the change at the output of the D flip-flop), and the new group number (9) at the output of D flip-flop 57 is propagated through the buffer 59 to arrive at pin 67 which is assigned a group identifier of 9 and a time delay value of 1 as shown in FIG. 2B. The primary inputs 34 and 35 are applied as inputs to the AND gate 39, and the AND gate 39 does not produce an identity function and does not produce a negation function and thus the output from AND gate 39 has a new group identifier (group identifier 6) and an initial time delay value of zero that is different than the group identifiers of the two inputs to the AND gate 39. Similarly, the output from the AND gate 43 has a new group identifier (7) and initial time delay value (0) which is propagated through the inverter 45 and then to the D flip-flop 47 to provide an input (which has a group identifier of −7 and a calculated time delay of 1) to the D flip-flop 47. A new group identifier (8) is assigned to the pin at the output of the D flip-flop 47. Operation 105 can continue in operation 107 in order to propagate the group identifiers until all pins have been assigned a group identifier or at least until the primary pins and outputs of all sequential cells (such as D flip-flops) have been assigned group identifiers. At this point, the simulation system can use the identified groups and time delay values to perform analysis of the electrical circuit which is simulated in the simulation system. This analysis can include simulation of dynamic voltage drop by using random vectors which are constrained by the identified groups and calculated time delay values. FIG. 4 shows an example of a method which can use these identified groups.

FIG. 4 shows a method in one embodiment which can use the identified groups to perform dynamic voltage drop simulations or timing/voltage simulations or other analyses. The method in FIG. 4 can begin in operation 151 in which a collection of bits or pins are determined in order to construct a random toggle pattern. In one embodiment, the collection of pins can be the pins in an aggressor set for a DVD victim vector in the design. In another embodiment, the collection of pins can be all of the primary input pins in the design instead of just a portion of the pins in the design such as an aggressor set which can be just a portion of all of the pins in the design. Then in operation 153, for each correlated group in the collection determined in operation 151, a random number can be generated in order to determine whether or not to toggle the group from the prior state of the group. Pins that are not in any correlated group can be randomly toggled using a vectorless toggle input. For example, if the pin or group under consideration in operation 153 was previously in a high-voltage state and the decision is to not toggle the pin or group, then the pin or group will remain in a high-voltage state for the next stage in the voltage drop analysis in the simulation. On the other hand, if it is decided to toggle the pin or group then the pin or group will switch to a low voltage state for the next voltage drop stage in the simulation. In one embodiment, determining whether or not to toggle the pin or group can be based upon a random number which is compared to a threshold such as a design toggle rate. If the random number in one embodiment is the same or less than the design toggle rate, then the bit is selected to toggle which will cause a switch between voltage states in a desired direction. If the pin is not part of a correlated group which has been identified using, for example, the method of FIG. 3, then the pin will toggle based upon the random number generated in operation 153. On the other hand, if the pin is part of a correlated group which has been identified using the one or more embodiments described herein, then operation 155 is performed. In effect, the toggling of pins in a group occur as a group as opposed to pins within a group such that the pins in the group are toggled in a correlated way and not randomly within the group.

As shown in operation 155 in FIG. 4, if the original bit or pin in a path is to be toggled, then all bits and pins with the same group identifier and same time delay value are marked as toggling in the same direction while all pins with the negated group identifier and same time delay value will toggle in the opposite direction. If the original bit or pin was chosen not to toggle then the method can mark all other bits or pins with the same group identifier (or negated group identifier) as not toggling. Pins within a group can also be randomly selected to toggle, and in this case, all pins in the group with the same time delay value as the selected pin will also toggle while all other pins in the group (having different time delay values) will not toggle. Referring back to FIG. 2B, if a decision is made to toggle pin 63 then the pin directly coupled to the clock input of flip-flop 57 will also toggle because those pins are in the same correlated group and have the same time delay value. Operations 153 and 155 can be applied repeatedly over time until all pins in the design are assigned a toggling decision for the purpose of the DVD simulation. The results of operations 153 and 155 can produce a set of toggling decisions which represent the different toggle states over time during a particular DVD simulation.

In operation 157, the method can apply additional constraints to the toggle selection if any of the bits in the group belong to an intergroup constraint, such as an n-hot or n-cold encoding scheme. These encoding schemes, as is known in the art, dictate the number of bits which can toggle in the scheme between successive states and thus this intergroup constraint must be applied for pins that are in such a scheme. In addition, operation 157 can also apply additional constraints based upon two or more identified groups which are correlated with each other. It is possible that two different identified groups, each of which are correlated within their own group, are also correlated with another group which has been identified. Thus, the selection of a particular toggle state or toggle decision for one pin in one of the identified groups can dictate the selection of toggle decisions or toggle states for other pins within the same group and also within other groups that are correlated with the first group. In one embodiment, operation 157 can enforce or constrain switching or toggling between two such correlated groups for the same time delay values. As an example of two different identified groups that are correlated, consider two different blocks that have a similar structure which includes a set of m outputs from a 1-hot multiplexor selector, where for the m outputs, only one of the m outputs can switch at one time. However, the second of the two blocks (due to system constraints or input conditions) can switch at the same time with the first block (of the two blocks) only 50% of the time. That is, with a 0.5 probability, both blocks are enabled (and only one of their m outputs can switch) and with the remaining probability only one block is active. Within each bloc, the pins (m outputs) are correlated by a 1-hot encoding scheme but between the groups there is known, probability based, correlation.

Then in operation 159, the system can perform an analysis, such as a non-propagated vectorless DVD simulation using the random vectors which have been constrained by the correlated groups and the time delay values within each group. Thus, the DVD simulation can eliminate toggling which would not occur in the actual physical circuit thereby making the DVD simulation more realistic and avoiding a pessimistic assessment of the power grid or power distribution network in the simulated design (when the pessimistic assessment is not realistic). The embodiments of the methods shown in FIGS. 1, 3, and 4 can use information, such as instance connections and time delays, within each correlated group that is purely local and hence no event scheduling or propagation is needed. Further, these embodiments can produce much higher quality random stimulus (e.g., the toggling vectors that are constrained by identified groups and time delays within the groups) that preserves causality within the correlated groups. These one or more methods can be mixed with customer provided real test vectors (instead of random vectors). These one or more methods can be particularly useful with clock trees, which consist of a single group up to the final clock gates; the use of switching correlation groups with time delay values can permit vectorless flows to generate logically consistent casual event chains that can be used in clock jitter computations without requiring the generation and use of difficult jitter stimulus vectors.

Another aspect of this disclosure relates to the determination and use of switching activity times to develop refined timing windows that can be used in one or more simulations of an electrical design; these refined timing windows can constrain switching activity when random dynamic voltage drop vectors are used in one or more simulations such as non-propagated vectorless DVD simulations. Vectorless dynamic voltage drop analysis tools can automatically construct random activity to simulate the draw on a design's power supply. These events are intended to fully replicate actual current demand that occurs during normal design operation. One of the dominant approaches to construct these random activity patterns (also referred to as toggle vectors) is a technique called non-propagated vectorless (NPV). In this approach, each instance in the design has a random probability of toggling at any cycle at a random time within that cycle. To make these switching events more realistic, the time when an instance can switch is constrained by its timing window. A timing window is a range of time (minimum time and maximum time) that can be obtained from a static timing analysis tool (STA), and the timing window describes the earliest and latest possible times an instance can switch under any possible timing scenario. These NPV techniques assume that an instance can switch any time within the timing window's minimum and maximum times. However, timing windows as provided by conventional STA tools make no such assurance. The only assurance is that events can occur at the minimum and maximum times and there is no guarantee that events are possible anywhere else within the timing window. The minimum time preserves the fastest signal slew rate and earliest arrival of a signal transition and the maximum time preserves the slowest slew rate and the latest possible arrival time of the signal transition. Traditional STA tools maintain timing accuracy at maximum performance and capacity and do not preserve temporal activity regions. It turns out that many circuits will often not switch during periods of time within the minimum time and the maximum time and an example of this behavior is provided below. As a result, traditional STA tools produce pessimistic dynamic voltage drop simulation results. The embodiments described according to this aspect provide refined timing windows by determining whether switching inactivity times exist for each pin in a set of pins, and these switching inactivity times represent gaps in time during which the pin will not switch. These switching inactivity times can be referred to as forbidden times.

Figure 5:
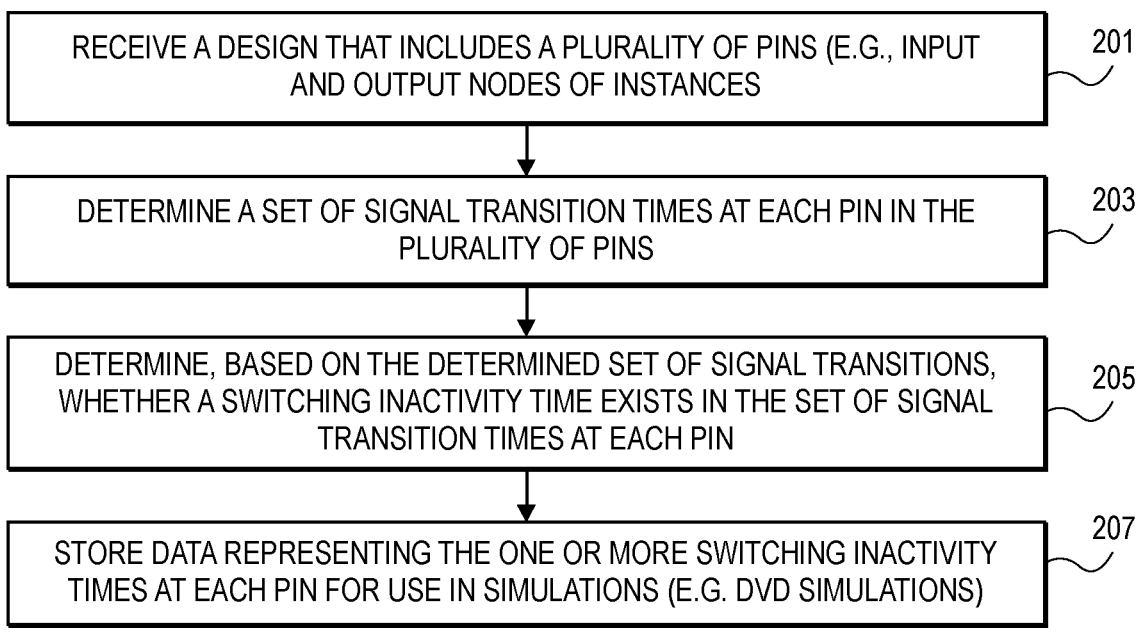
FIG. 5 is a flowchart that illustrates a method according to an aspect that uses refined timing windows.
Figure 6A:
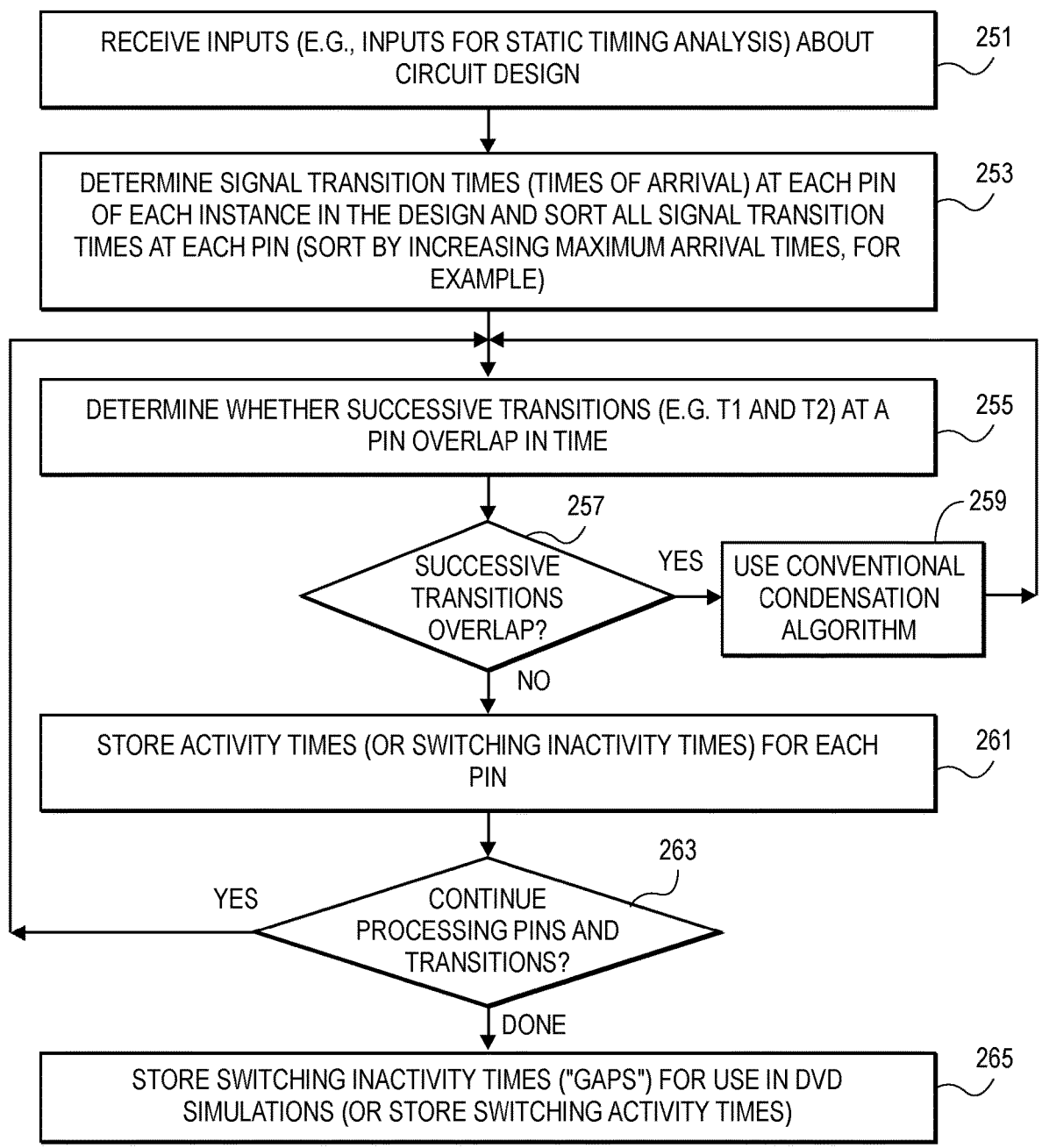
FIG. 6A shows a flowchart that depicts a method according to one embodiment that determines switching inactivity times.

FIG. 5 shows an example of a method according to one embodiment which determines whether switching inactivity time exists for any given pin in a design. In operation 201, a data processing system can receive data about an electrical design such as an integrated circuit. This data can be the same data that is used for conventional static timing analysis done by a conventional static analysis tool. For example, this data can include cell library data, design data in Verilog for example, data about the parasitics of the design and data about design constraints. This data can be used as is known in the art to determine times on a pin during which a signal transition can occur. In one embodiment, the signal transition times on a pin are recorded as transitions which provide the minimum and maximum timing window on that pin, and each of the minimum and maximum times consists of a slew rate or time and an arrival time for the signal transition. Anytime multiple signal transitions are constructed that apply to the same pin in the design, a condensing algorithm can be applied. Conventionally, this is where all multiple transitions at the pin would be reduced to a single transition that covers the entire time between the earliest minimum time and the latest maximum time. The embodiment in FIG. 5 deviates from this approach by determining, in operation 203, a set of signal transition times at each pin in the plurality of pins. These determined signal transition times at each pin are then used in operation 205 to determine whether one or more switching inactivity times exist in the set of signal transition times at each pin. The example of the circuit 301 shown in FIG. 6B provides an example of how the method shown in FIG. 5 can detect switching inactivity times which exist for a pin in the design, such as the output pin from the instance 307 (NAND gate A1) shown in FIG. 6B. FIG. 6B will be described further below in conjunction with the description of FIG. 6A. The switching inactivity time periods which are determined in operation 205 provide a refined timing window that indicates gaps in time when no switching will occur at the pin. This allows the system to store data, in operation 207, representing the one or more switching inactivity times at each pin for use in constructing random activity patterns or toggling vectors for DVD simulations. In one embodiment, the stored data can represent the switching inactivity times by storing the inverse of those times, where the inverse of those times are the switching activity times during which the pin has been determined to be capable of having signal transitions. The method shown in FIG. 5 provides an overview of an embodiment while the method shown in FIG. 6A provides a more specific embodiment.

Referring now to FIG. 6A, in operation 251, a data processing system, such as a simulation system, receives inputs about the circuit design. These inputs can be similar to the inputs received in operation 201 in FIG. 5. Then in operation 253, the data processing system can determine, for each pin, the signal transition times which are normally the times of arrival at each pin of all possible signal transitions for particular instance in the design. In one embodiment, the data processing system can sort all possible signal transition times at each pin by sorting them with increasing maximum arrival times in one embodiment. The sorting by increasing maximum arrival times provides a sorted list that is used in the remaining operations by iterating over the sorted list of transitions until no changes are made to the transitions. In operation 255, the simulation system, such as a data processing system, can determine whether successive signal transitions at a pin overlap in time. FIG. 6C graphically represents operation 255. The AND gate 351 has inputs 353A and 353B that determine the state of the output 352. Normally, the determination of overlap considers the effect of multiple signal transitions converging at the output of a cell which in this case is the output 352. Signal transitions at each input (353A and 353B) can produce a new waveform at the output 352, and as a result, multiple signal transitions converge at output 352. The delay through the cell (AND gate 351) from a signal transition at an input can be calculated and used to derive the new waveform, at the output, based on the time of arrival of the signal transition at the input and the delay through the cell for that input. The delay through the cell for input 353A can be different than the delay through the cell for input 353B, and this difference can effect whether the timing windows (of the signal transitions) overlap. The result of each signal transition (occurring at the inputs) can, after the different delays through the cell are taken into account, produce converging signal transitions at the output, and these converging signal transitions can be analyzed for overlap at the output. In some embodiments, multiple converging signal transitions at a cell input can also be analyzed for overlap, such as when multiple driven net conditions exist. The pin 352 can have, in one example, no overlap (shown as no overlap 355) when two different signal transitions occur at different times that do not overlap. In another example, the pin 352 can have an overlap 357 when two successive signal transitions do overlap in time as shown in FIG. 6C. When successive signal transitions overlap in time, as determined in operation 257 of FIG. 6A, the data processing system proceeds to use, in operation 259, conventional condensing algorithms to merge the two successive signal transitions into a single larger signal transition having a minimum time and a maximum time. When the signal transitions do not overlap, the method stores, in operation 261, the activity times for each pin separately for the two successive transitions. Another words, the method will store the switching activity times for this first transition separately from the switching activity times for the second transition and there will be a gap in time between the two switching activity times which represents the switching inactivity time between the two successive signal transitions which did not overlap as determined in operation 257. Processing can continue in operation 263 when there are further pins and further signal transitions to process, in which case processing reverts back to operation 255. If all pins and transitions have been processed processing will proceed to operation 265 in which the data processing system will store the switching activity times or gaps for each pin, in a set of pins, for use in one or more simulations. In one embodiment, the switching activity times are stored rather than the gaps in time in which no activity occurs. The stored data is then used in simulations, such as one or more NPV DVD simulations.

In one embodiment, operation 257 can use the following approach to determine whether an overlap exists. For each transition (e.g., T1) at the pin in the sorted list, a data processing system tests whether its minimum/maximum times overlap with the minimum/maximum times of the next transition (e.g., T2) in the sorted list. Overlap exists if: T1 max time>=T2 min time−merge margin. The merge margin is a user supplied number that is zero or greater; merge margin numbers greater than zero increase the amount of condensing (operation 259) that will be performed, which will improve capacity and performance, at the expense of losing information on gaps that are smaller than the merge margin. Note that, due to the sorting in operation 253, it is implied that T1 max time<=T2 max time.

FIG. 6B shows an example of the circuit 301 which can be processed using the method shown in FIG. 6A to determine that there are two separate switching activity times which are separated by a switching inactivity time from time 3 to time 5. The circuit 301 includes two flip-flops 303 and 305 and four inverters 309; the four inverters are connected in series from the output of the flip-flop 303 to the input of the NAND gate 307. The output from the flip-flop 305 is coupled directly to the other input of the NAND gate 307. The circuit 301 is annotated with time delay values which represent the time delay introduced by an instance such as a flip-flop or inverter in the circuit 301. A conventional condensation algorithm 313 will produce a single timing window having a minimum time of 2 and a maximum time of 6 over which the output pin of the NAND gate 307 can switch. The method shown in FIG. 6A produces two separate switching activity times of (2,2) and (6,6) which are separated by a switching inactivity time from time 3 to time 5. This is due to the fact that there are no successive signal transitions which overlap during the times 3 to 5 but there are successive signal transitions which overlap at times 2 and 6. As a result, the method of FIG. 6A can produce a refined timing window, for the output pin of NAND gate 307 that has two separate switching activity times and one switching inactivity time which is a gap between the two switching activity times. The embodiments described herein can use the switching activity times to prevent random activity patterns for this pin during the gap when performing one or more DVD simulations such as one or more NPV DVD simulations. Thus, the method of FIG. 6B will create activity times that can be stored for the output pin of the NAND gate 307, and the stored data indicates that random switching or toggling activity should be suppressed or constrained during the switching inactivity time from time 3 to 5. While time (e.g., time=3) has been described as an integer in this example of FIG. 6B, it will be understood that time is normally represented by a floating point number.

Figure 7:
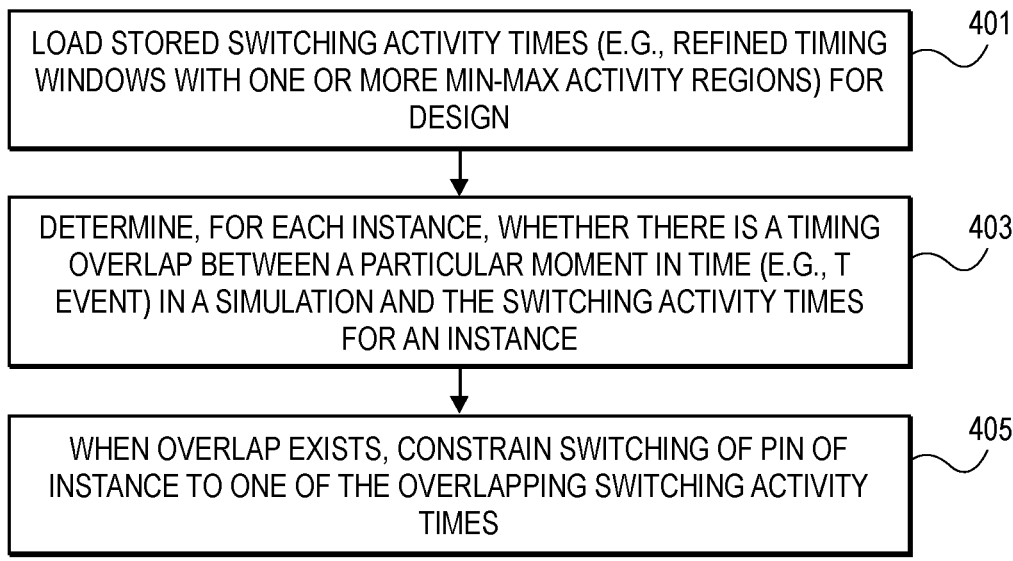
FIG. 7 is a flowchart that shows an embodiment of a method for using stored switching activity times in one or more simulations.

Once the stored data has been obtained by the method shown in FIG. 6A, it can be used in one or more simulations, such as one or more NPV DVD simulations, and this is shown in the method shown in FIG. 7. In operation 401 of FIG. 7, a data processing system can load stored switching activity times which represent refined timing windows with one or more minimum and maximum time activity regions for each pin, in a set of pins in the design. Then in operation 403, the data processing system can determine, for each instance, whether there is a timing overlap between a particular moment in time in the simulation (e.g., T event) and the switching activity times for a pin in an instance. As shown in operation 405, when an overlap exists as determined in operation 403, the switching of the pin of the instance is constrained to one of the overlapping switching activity times and this prevents switching activity during the switching inactivity times.

Figure 8:
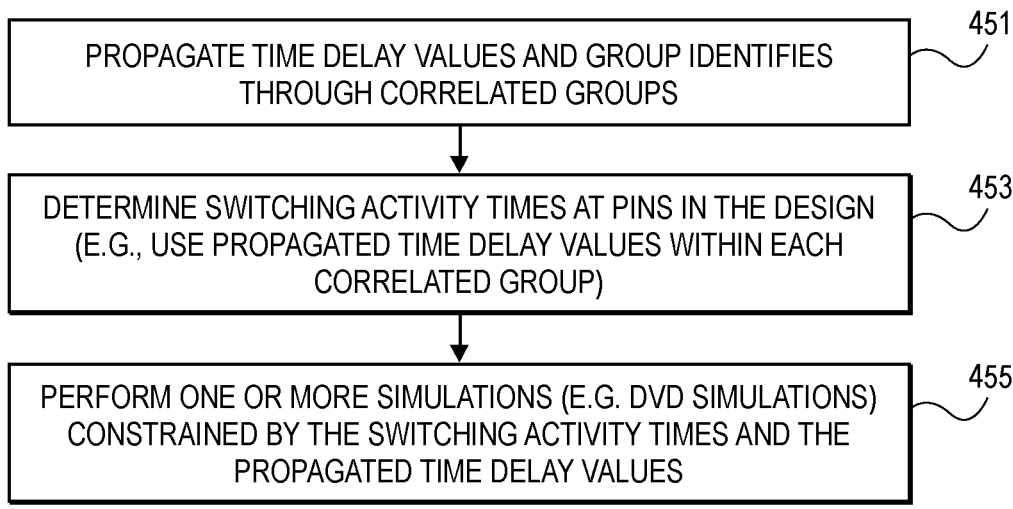
FIG. 8 shows a flowchart that illustrates a method the combines the aspect of time delays in correlated groups with stored switching times in refined timing windows.

In one embodiment, both of the aspects described herein can be combined in a single method which uses both aspects. In particular, the aspect which propagates time delays and group identifiers through correlated groups to limit switching activity is combined with the aspect which determines switching inactivity times in order to prevent switching activity in the simulation for the switching inactivity times. In the method shown in FIG. 8, the time delay values can be propagated along with the group identifiers through the correlated groups in operation 451. In operation 453, the system can also determine switching activity times at pins in the design. In one embodiment, the propagated time delay values may be used within each correlated group to assist in determining switching activity times. Then in operation 455, one or more simulations, such as one or more NPV DVD simulations are constrained by the switching activity times and the propagated time delay values. It will be appreciated that operation 451 can include an embodiment of the method shown in FIG. 3. It will also be appreciated that operation 453 can include an embodiment of the method shown in FIG. 6A. The combination of these two aspects in a single method can provide a synergistic effect and further reduce pessimistic results from DVD simulations.

Figure 9:
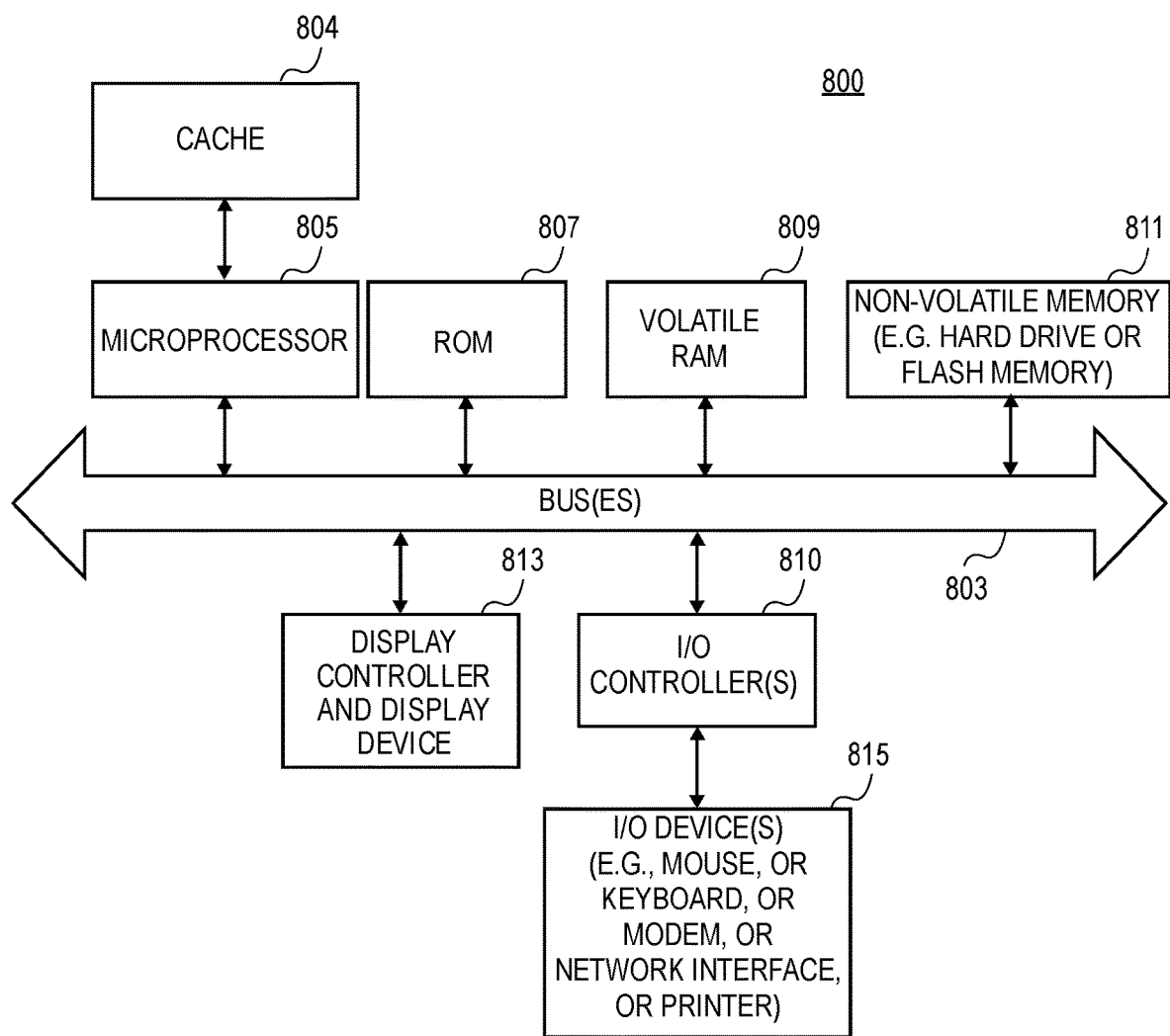
FIG. 9 shows an example of a data processing system that can be used to implement one or more of the embodiments described herein.

FIG. 9 shows one example of a data processing system 800, which may be used with one embodiment. For example, the system 800 may be implemented to provide a system or device that performs any one of the methods described herein. Note that while FIG. 9 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 9, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 9 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
    receiving a design representing an electrical circuit that includes a plurality of pins, the plurality of pins including one or more input nodes or one or more output nodes in the electrical circuit;
    identifying, in the design, one or more groups of pins that are correlated such that, within each identified group, all of the pins in each identified group switch between voltage states in a correlated way;
    assigning, for each pin in each identified group, an identifier for the identified group and a time delay value based on a delay at the pin from an initial point in the identified group's logic chain to the pin.

2. The medium of claim 1, wherein the initial point is an input pin of the logic chain.

3. The medium of claim 2, wherein the delay at the pin is based on design data about logic instances from the initial point to the pin.

4. The medium of claim 3, wherein the design data specifies data from which time delays in signal propagation can be estimated.

5. The medium as in claim 1, wherein the method further comprises:
    storing data for each pin in each identified group, the stored data comprising the identifier for the identified group and the time delay at the pin.

6. The medium as in claim 5, wherein the method further comprises:
    performing one or more simulations of the design using the stored data.

7. The medium as in claim 6, wherein the one or more simulations comprise: (1) one or more dynamic voltage drop simulations or (2) timing/voltage analysis simulations or (3) one or more dynamic voltage drop simulations and one or more timing/voltage analysis simulations.

8. The medium as in claim 5, wherein the method further comprises:
    determining, for each pin in each identified group, whether a switching inactivity time exists in a set of signal transition times at the pin.

9. The medium as in claim 8, wherein the method further comprises:
    storing data representing the switching inactivity time for use in one or more simulations, and wherein switching activity in the one or more simulations is constrained by the stored data representing the switching inactivity time.

10. The medium as in claim 9, wherein the method further comprises:
    performing one or more simulations of the design using the stored data, wherein the one or more simulations comprise: (1) one or more dynamic voltage drop simulations or (2) timing/voltage analysis simulations or (3) one or more dynamic voltage drop simulations and one or more timing/voltage analysis simulations.

11. A machine implemented method, the method comprising:
    receiving a design representing an electrical circuit that includes a plurality of pins, the plurality of pins including one or more input nodes or one or more output nodes in the electrical circuit;
    identifying, in the design, one or more groups of pins that are correlated such that, within each identified group, all of the pins in each identified group switch between voltage states in a correlated way;
    assigning, for each pin in each identified group, an identifier for the identified group and a time delay value based on a delay at the pin from an initial point in the identified group's logic chain to the pin.

12. The method of claim 11, wherein the initial point is an input pin of the logic chain.

13. The method of claim 12, wherein the delay at the pin is based on design data about logic instances from the initial point to the pin.

14. The method of claim 13, wherein the design data specifies data from which time delays in signal propagation can be estimated.

15. The method as in claim 11, wherein the method further comprises:
    storing data for each pin in each identified group, the stored data comprising the identifier for the identified group and the time delay at the pin.

16. The method as in claim 15, wherein the method further comprises:
    performing one or more simulations of the design using the stored data.

17. The method as in claim 16, wherein the one or more simulations comprise: (1) one or more dynamic voltage drop simulations or (2) timing/voltage analysis simulations or (3) one or more dynamic voltage drop simulations and one or more timing/voltage analysis simulations.

18. The method as in claim 15, wherein the method further comprises:
    determining, for each pin in each identified group, whether a switching inactivity time exists in a set of signal transition times at the pin.

19. The method as in claim 18, wherein the method further comprises:
    storing data representing the switching inactivity time for use in one or more simulations and wherein switching activity in the one or more simulations is constrained by the stored data representing the switching inactivity time.

20. The method as in claim 19, wherein the method further comprises:
    performing one or more simulations of the design using the stored data, wherein the one or more simulations comprise: (1) one or more dynamic voltage drop simulations or (2) timing/voltage analysis simulations or (3) one or more dynamic voltage drop simulations and one or more timing/voltage analysis simulations.

* * * * *